United States Patent Office 3,203,753
Patented Aug. 31, 1965

3,203,753
TEXTILE DYE CARRIER-EMULSIFIER
COMPOSITIONS
Edwin C. Sherburne, Fairfax, Wilmington, Del., assignor to Atlas Chemical Industries, Inc., Wilmington, Del., a corporation of Delaware
No Drawing. Filed May 31, 1961, Ser. No. 113,669
5 Claims. (Cl. 8—83)

This invention relates to textile dye carrier emulsifier compositions. In particular, this invention relates to textile dye carrier-emulsifier compositions which are used with dyes of the "disperse" or "acetate" class, said dyes being especially useful in dyeing fibers which are hydrophobic, such as polyester and cellulose triacetate fibers.

Synthetic textile fibers which are hydrophobic, especially polyester and cellulose triacetate fibers, are particularly difficult to dye. They can be dyed satisfactorily with dyes of the "disperse" or "acetate" class using a special technique involving the use of "carriers." These dyes have a very limited solubility in water, and it is necessary to disperse the dyestuff in the dyebath in the form of finely-divided solid particles.

The dye carriers which are used in conjunction with disperse dyes are usually water-insoluble materials which also must be emulsified or in some way suspended in the dyebath. These carriers are believed to function in two ways: (1) by partially swelling the fiber to facilitate penetration and diffusion of the dye into the fiber, and (2) by acting as a solvent for the dye, and thus reducing the agglomerated dye particles to a size which can more readily penetrate the fiber.

Some dye carriers which are presently commercially available may be dissolved in a sodium hydroxide solution, added to a dyebath, and precipitated as a fine dispersion by the addition of acetic acid. This procedure suffers from the disadvantages that it is time consuming, limits the pH of the dyebath, and the dispersion which is formed is not stable. If the dyebath is not used promptly, the dispersed droplets of carrier will coalesce, forming larger drops which cause spotty dyeing. Dye carriers may also be emulsified in a dyebath by means of surface active agents, and the formation of a stable, aqueous dyebath emulsion helps to overcome the problem of spotty dyeing.

Textile mills generally prefer to use a ready-made product containing both a dye carrier and an emulsifier. Some commercially available dye carrier-emulsifier compositions perform well as dye carriers but suffer from the following disadvantages: (1) they are grainy pastes and therefore, very difficult to handle and to measure; (2) they are not readily dispersed in water and generally require that the dispersion be boiled; (3) their aqueous dispersions are not stable, requiring that the dispersion be prepared and added to the dyebath immediately before dyeing in order to avoid separation; and (4) they must be used at relatively high concentrations in order to obtain a given dye shade.

It is an object of this invention to provide a dye carrier-emulsifier composition which is effective in processes for dyeing hydrophobic synthetic fibers with disperse dyes.

Another object of the invention is to provide a uniform, liquid dye carrier-emulsifier composition which is easily handled and measured.

It is also an object of this invention to provide a dye carrier-emulsifier composition which is readily dispersible or emulsifiable in water.

Still another object of the invention is to provide a dye carrier-emulsifier composition which forms stable aqueous emulsions.

A further object is to provide a dye carrier-emulsifier composition which may be used at relatively low concentrations in a dyebath to obtain a given shade of dyed fiber.

A still further object of the invention is to provide a dye carrier-emulsifier composition which yields level uniform dyeings.

Other objects and purposes of this invention will be apparent to those skilled in the art from the description which follows.

It has been discovered that dye carrier-emulsifier compositions consisting essentially of a dye carrier component and an emulsifier component consisting essentially of a cationic and a nonionic emulsifier are particularly effective for dyeing fibers with disperse dyes. In accordance with this invention, the various components are preferably selected so that the resulting dye carrier-emulsifier composition is a liquid, though it may be necessary to include a solvent in the carrier component when a solid dye carrier, such as biphenyl, is used. It is desirable that the final dye-carrier-emulsifier product be a liquid for this provides ease of handling and measuring and also facilitates dispersing or emulsifying the carrier-emulsifier composition in the dyebath.

The dye carrier component acts as a chemical assistant for the disperse dye by promoting penetration and sorption of the dyestuff into the textile. The carrier acts by producing an intimate contact between the textile fiber and the dyestuff, and its function is affected by such factors as the nature of the fiber, the nature of the dyestuff, the dyeing medium, etc. In general, dye carriers should be cheap, functional and easily removed from the fiber after dyeing in order to prevent adverse effects on light fastness. Any of the conventional dye carriers may be used in the compositions of this invention. The following compounds are representative of conventional dye carriers: o-phenylphenol, p-phenylphenol, o-dichlorobenzene, trichlorobenzene, monochlorobenzene, biphenyl, methyl salicylate, butyl benzoate, benzoic acid, etc.

If the compound which is selected as the dye carrier is a solid, a solvent for the dye carrier should also be present in the dye carrier component in order that the final dye carrier-emulsifier product be a liquid. Generally, a compound which is also a known dye carrier may be used as the solvent. For example, trichlorobenzene, butyl benzoate or methyl salicylate may be used as solvents for biphenyl, a solid dye carrier. The dye carriers which are generally used in disperse dyeing processes have limited water solubility (the dyestuffs are also water insoluble), and therefore, it is necessary to add emulsifiers to the aqueous dyebaths in order to disperse or emulsify the carrier (and the dyestuff) in the bath.

In accordance with this invention, the emulsifier component of the dye carrier-emulsifier compositions consists essentially of a cationic emulsifier and a nonionic emulsifier. This dual emulsifier component performs several functions in the disperse dyeing operation. It has been found that by adding cationic and nonionic emulsifiers to the same disperse dyebath, very good emulsion stability is achieved. As previously indicated, the emulsion which is formed comprises a dyestuff-dye carrier-in-water emulsion. When both the cationic and nonionic emuusifiers are present in the dyebath, the emulsion will remain stable for several hours. This eliminates the necessity for preparing the emulsion immediately prior to dyeing, though it is preferable not to let the emulsion stand too long before use. In addition, the formation of a stable emulsion provides better dyeing.

The cationic and nonionic emulsifiers perform other functions in addition to forming stable emulsions. The cationic emulsifier also affects the efficiency of the compositions of this invention as dye carriers. The cationic emulsifier promotes deposition of the emulsified droplets of carrier on the fabric during the dyeing, resulting in improved efficiency of dyeing. The nonionic emulsifier also functions as a leveling agent for the disperse dyes which helps to promote uniform (level) dyeings.

Any of the conventional cationic and nonionic emulsifiers can be used in the compositions of this invention, the only requirements being that when added to the dye carrier component, the resulting dye carrier-emulsifier composition should be liquid and dispersible in water. Typical of the cationic emulsifiers which may be used are quaternary ammonium compounds, acid salts of fatty amines, sulfonium compounds, etc. The nonionic emulsifier may be alkylene oxide derivative, and it is particularly preferred to use ethylene oxide derivatives such as ethylene oxide derivatives of fatty alcohols, fatty amines, fatty acids, phenols, etc. It is generally preferred that the ethylene oxide derivatives contain at least about 5 moles of ethylene oxide per mole so that it will be sufficiently hydrophilic to form a stable aqueous emulsion when used in combination with the cationic emulsifier. A detailed description of cationic and nonionic emulsifiers useful in this invention may be found in Surface Active Agents, by Anthony M. Schwartz and James W. Perry, Interscience Publishers, Inc., New York, N.Y., pp. 151–214 (1949).

In addition to the particular types of emulsifier which are used in combination, the ratio of the two emulsifiers and the total amount of emulsifier used also affect the aqueous emulsion stability and the quality of the dyeing. The emulsifier ratio, cationic/nonionic, is preferably selected so as to give optmium, aqueous emulsion stability and dyeing characteristics. In general, a cationic/nonionic ratio which will form a stable aqueous emulsion will fall within a range of from about 0.2 to about 5, though the ratio yielding optimum aqueous emulsion stability will vary within this range depending upon the particular cationic and nonionic emulsifiers which are used. It is a relatively easy matter to vary the cationic/nonionic ratio to determine optimum aqueous emulsion stability and dyeing characteristics. Emulsifier ratios outside of the about 0.2 to about 5 range may cause poor emulsion stability, poor (spotty) dyeings, or dyeings that are too light in shade to be practical.

The proportion of dye carrier component per amount of emulsifier component is also based upon emulsion stability and dyeing properties. It is generally preferred that the dye carrier component be present in amounts ranging from about 20 to about 80 weight percent based on the total dye carrier-emulsifier composition. If the dye carrier constitutes less than about 20 weight percent, this is impractical, for more dye carrier should be present in order to properly dye textile fibers. If more than about 80 weight percent of dye carrier is present, unstable dye carrier-emulsifier compositions and unstable dye bath emulsions may result.

Though it is preferred that the dye carrier and emulsifiers be blended into an easily handled liquid prior to their addition to the disperse dyebath, the separate addition of dye carrier, cationic emulsifier and nonionic emulsifier to the dyebath is within the scope of this invention. Generally, the dye carrier plus cationic and nonionic emulsifiers will constitute from about 1 to about 50 weight percent of the fabric to be dyed, though this is a matter of operator's choice and depends upon the shade to which the fabric is to be dyed.

As previously indicated, the dye carrier-emulsifier compositions of this invention are used to assist the disperse dyeing of textile fibers, particularly those which are hydrophobic such as polyester and cellulose acetate fibers. The disperse dyes which are commonly used include compounds of the azo, azomethine, nitroarene and anthraquinone chemical classes. They are used for almost all the dyeing of cellulose acetate and polyethylene terephthalate textile fibers. They are also used in dyeing nylon where uniform coloration is desired. The following compounds are representative of the disperse dyes: nitroamino-azobenzene, aminoanthraquinone, hydroxyanthraquinone, hydroxy - aminoanthraquinone, aminoanilinoanthraquinone, toluninanthraquinone, etc.

Conventional disperse dyeing techniques may be employed when using the novel dye carrier-emulsifier compositions of this invention. The disperse dyestuff may be added to the aqueous dyebath either before or after the dye carrier and emulsifiers are added. A typical dyeing procedure which may be employed comprises adding to an aqueous dyebath at a temperature of about 110° F. to about 170° F., a quantity of the dye carrier-emulsifier composition sufficient to provide from about 1 to about 50 weight percent, and preferably from about 4 to about 15 percent, of dye carrier per weight of material to be dyed. A preferred dyebath temperature for the addition of the carrier-emulsifier composition may be approximately 120° F. After the addition of the carrier and emulsifiers, the dyestuff may be added and the temperature of the bath slowly adjusted to the temperature desired for carrying out the dyeing.

The following operative examples are presented to further illustrate the compositions and methods of this invention. In these examples, all percentages are by weight unless otherwise specified.

EXAMPLE I 100 grams of a dye carrier-emulsifier composition having the following formulation was prepared:

| Ingredient: | Amount (weight percent) |
|---|---|
| Biphenyl (dye carrier) | 20 |
| Trichlorobenzene (dye carrier solvent) | 50 |
| Diethyl sulfate quaternary of 1-hydroxyethyl-2-heptadecenyl imidazoline (cationic emulsifier) | 15 |
| Polyoxyethylene (40) castor oil (nonionic emulsifier) | 15 |

The ingredients were weighed out and mixed together with stirring. The mixture was gently warmed until all of the biphenyl had completely dissolved. The composition remained clear and fluid when cooled to room temperature.

The dye carrier-emulsifier composition was stirred into a warmed (about 140° F.), aqueous dyebath containing Latyl Brilliant Blue BG dyestuff (manufactured by E. I. du Pont de Nemours and company and identified as C.I. Disperse Blue 60 in the Colour Index of The American Association of Textile Chemists and Colorists). Three concentrations of dye carrier-emulsifier composition were tested: about 4% for light shades, about 6% for medium shades and about 8% for heavy shades (percentages based on the weight of the fabric to be dyed). The results indicated that the dye carrier-emulsifier composition was an effective dye carrier and produced uniform (level) dyeings on Dacron polyester fiber.

EXAMPLES II–VI

Several other dye carrier-emulsifier compositions were prepared and tested for dyeing Dacron polyester fiber with Latyl Brilliant Blue BG, C.I. Disperse Blue 60, as in Example I. The formulations used to prepare these compositions are presented in Table I. The following code for emulsifiers is used in Table I:

Cationic:
    A—Diethyl sulfate quaternary of 1-hydroxyethyl-2-heptadecenyl imidazoline
    B—N-cetyl-N-ethyl morpholium ethosulfate Nonionic:
    C—Polyoxyethylene (40) castor oil
    D—Polyoxyethylene (10) nonyl phenol
    E—Polyoxyethylene (25) hydrogenated castor oil
    F—Polyoxyethylene (20) sorbitan monolaurate

Table I

| Example No. | Dye Carrier | Dye Carrier Solvent | Cationic Emulsifier | Nonionic Emulsifier |
|---|---|---|---|---|
| II | Biphenyl, 20% | Trichlorobenzene, 40%. | A, 20% | C, 20%. |
| III | ____do____ | ____do____ | A, 20% | D, 20%. |
| IV | Methyl salicylate 33⅓%. | | B, 33⅓% | E, 33⅓%. |
| V | Butyl benzoate, 70%. | | A, 15% | F, 15%. |
| VI | Biphenyl, 20% | Butyl benzoate, 50%. | A, 15% | F, 15%. |

The results of dyeings assisted by the formulations of Examples II to VI are as follows:

Example II: The ratio (½) of biphenyl to trichlorobenzene was satisfactory (no crystallization), but the aqueous dyebath emulsion of Example I, which illustrates a preferred composition, was more stable and the dyeings of Example I were better than those of Example II.

Example III: In this formulation, the nonionic emulsifier was changed to polyoxyethylene (10) nonyl phenol and it yielded a satisfactory carrier-emulsifier composition.

Example IV: This formulation, using different emulsifiers and methyl salicylate as the dye carrier, produced excellent aqueous dyebath emulsions, but in the dyeing process, the dye carrier efficiency of the carrier used in Example I was better than that of Example IV.

Example V: This formulation provided an excellent, very stable aqueous emulsion and yielded a level (uniform) dyeing.

Example VI: This formulation provided a clear liquid concentrate which formed stable aqueous emulsions and yielded a level dyeing.

The term "consisting essentially of," as used in this specification and the claims which follow, included compositions containing the named ingredients and any other ingredients which do not deleteriously affect the compositions for the purposes stated in the specification.

Having completely described this invention, what is claimed is:

1. A liquid composition of matter consisting essentially of a water-insoluble organic dye carrier component and an emulsifier component consisting essentially of a cationic emulsifier and a nonionic emulsifier with the ratio of cationic emulsifier to nonionic emulsifier ranging from about 0.2 to about 5, and said dye carrier component constituting from about 20 to about 80 weight percent of the total composition.

2. The composition of claim 1 in which the nonionic emulsifier is an ethylene oxide derivative.

3. The composition of claim 2 in which the ethylene oxide derivative contains at least about 5 moles of ethylene oxide per mole.

4. The composition of claim 3 in which the cationic emulsifier is the diethyl sulfate quaternary of 1-hydroxyethyl-2-heptadecenyl imidazoline.

5. The composition of claim 4 in which the ethylene oxide derivative is polyoxyethylene castor oil.

References Cited by the Examiner

UNITED STATES PATENTS

| | | |
|---|---|---|
| 2,123,740 | 7/38 | Murphy et al. _____ 8—58 |
| 2,880,050 | 3/59 | Fortess et al. |
| 2,934,397 | 4/60 | Landerl. |

OTHER REFERENCES

Goldsmith: Chemical Industries, March 1943, pp. 326–328.

Sisley: Amer. Dyestuff Reporter, vol. 38, No. 14, July 11, 1949, pp. 513–521.

Schwartz et al.: Surface Active Agents, Interscience Publishers Inc., New York, N.Y., pp. 151–214 (1949).

NORMAN G. TORCHIN, *Primary Examiner.*

MORRIS O. WOLK, ABRAHAM H. WINKELSTEIN,
*Examiners.*